L. L. B. DENIS.

METAL SPRING.

APPLICATION FILED NOV. 6, 1913.

Reissued Mar. 17, 1914.

13,699.

WITNESSES

Titus H. Brown

C. Coltrane

INVENTOR

Luc Léon Basile Denis

BY

C. W. Fairbanks

ATTORNEY

COLUMBIA PLANOGRAPH CO., WASHINGTON, D. C.

UNITED STATES PATENT OFFICE.

LUC LÉON BASILE DENIS, OF PARIS, FRANCE.

METAL SPRING.

13,699. Specification of Reissued Letters Patent. Reissued Mar. 17, 1914.

Original No. 1,008,794, dated November 14, 1911, Serial No. 475,904. Application for reissue filed November 6, 1913. Serial No. 799,619.

*To all whom it may concern:*

Be it known that I, LUC LÉON BASILE DENIS, of 135 Boulevard de Ménilmontant, in the city of Paris, Republic of France, have invented an Improved Metal Spring, of which the following is a full, clear, and exact description.

The present invention relates to a spring which by reason of its special construction possesses great elastic power for a minimum quantity of material.

This spring is formed from wire or metal rod of any convenient cross-section bent on a flat or conical surface to form the outline of a conventional star, the radiating arms of which are subjected to torsional stresses when the exterior and interior supporting planes are moving together or apart.

Figure 1:
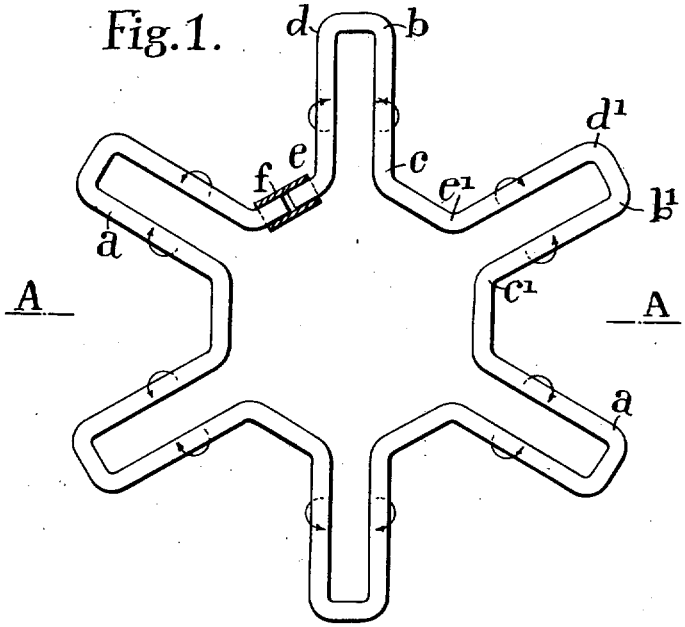
Figure 2:
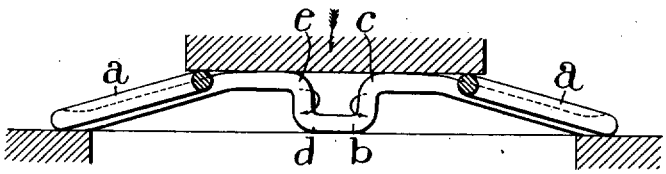
Figure 3:
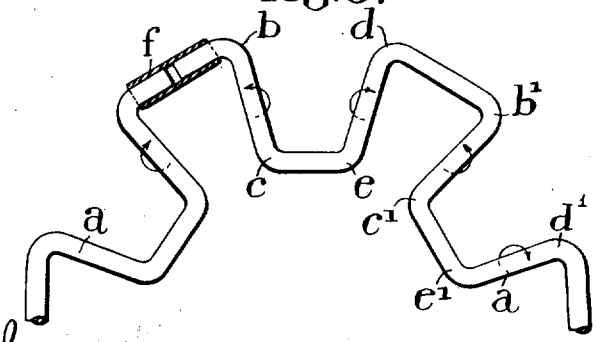

By way of example, the present invention is illustrated in the accompanying drawing in which:

Figure 1 is a plan of a spring made in accordance with the present invention. Fig. 2 is a vertical section taken on the line A—A, Fig. 1. Fig. 3 shows a modified form hereinafter referred to.

As shown in the drawing (Fig. 1) my improved spring is formed from wire or metal rod *a* of any suitable cross-section, bent in such a manner that in its entirety it has the contour of a star-shaped figure with double arms. This star-shaped figure may be formed on a flat surface or, preferably, on a conical surface as shown in Fig. 2 of the drawing, so that a loading pressure exerted on the interior circumference and a supporting reaction exerted on the exterior circumference, produce a deflection or yielding of the interior parts of the conical star-shaped figure until the latter is flattened out or inverted.

The elastic force of the spring results from the symmetrical torsion, in the direction indicated in the drawing by arrows, of the consecutive members *b*, *c* and *d*, *e*; $b^1$, $c^1$ and $d^1$, $e^1$; etc., which form the arms of the star. It follows that the transverse members *b*, *d*; *c*, $e^1$; etc., serve as connecting or tie-pieces uniting in pairs the extremities of the radiating members forming the arms of the star.

The point of junction of the two extremities of the wire or metal rod *a* forming the spring is arranged in one of these interior or exterior transverse members. The two extremities of the wire or rod are supported in alinement by means of a sleeve *f* or by any other convenient means. In the arrangement shown in Fig. 1, this union is made in one of the interior transverse members. The modified arrangement illustrated in Fig. 3 shows this point of junction in one of the exterior transverse members of a pair of arms.

In order to take account of the multiplicity of forces and of the dimensions of the improved spring, it will be useful to set out its geometrical properties the principal of which are as follows: 1. For the same exterior and interior diameters, and for the same deflection (or movement in the direction of the axis of the spring), the angle through which each active member *b*, *c*; *d*, *e*; etc., is bent is smaller as the number of the said members is increased, or inversely, the deflection, for a given force, increases with the number of the said active members. 2. The limiting angle of torsion before deformation or breaking of the spring increases with the length of the active members *b*, *c*; *d*, *e*; etc. 3. The strain which can possibly be obtained before such deformation or rupture depends solely on the diameter of the wire or metal rod and on the length of the active members; it is independent of their number.

From the above it will be understood that by selecting and combining in a suitable manner the diameter of the wire or metal rod *a*, and the length and the number of the arms of the star-shaped form, numerous types of springs can be produced which can be put to many and divers uses. Moreover the improved spring which in use is subjected to torsional stresses, possesses, as do coiled springs similarly subjected to torsional stresses, a very great resiliency or elastic power in proportion to the weight of material employed. The inert parts *d*, *b*; *c*, $e^1$, etc., in practice can be reduced to a minimum with respect to the active members, so as to obtain maximum utilization of the elastic material.

The improved spring as has been stated hereinabove can be put to numerous uses. It can for example be applied to lateral reaction elastic wheels, and used in cases where elasticity over a large surface is necessary.

The arrangements hereinabove set forth are given only by way of example, the forms, dimensions, and details of arrangement can be varied to meet the needs of particular applications, without departing from the principle of my present invention.

Claims:

1. A spring formed from a rod of metal bent into star-shape with double arms, the side members of which are straight and incline upwardly and inwardly, whereby a conical torsional spring is produced.

2. A spring formed of a single piece of wire bent into star-shape with double arms having its ends united in one of the connecting portions of said arms, the side members of the arms being straight and inclined upwardly and inwardly.

3. A spring comprising a ring-like body and a plurality of arms projecting from said body, the whole being formed from a single piece of wire having its ends united and each arm including two side members lying in the same plane, the outer ends of said arms and said ring-like body being relatively movable in the direction of the axis of said ring-like body when said spring is in use and said movement being resisted by torsional stresses set up in the portions of the wire forming the side members of said arms.

4. A spring formed of a single piece of wire bent into star shape with double arms, said wire having its ends united in one of the connecting portions of said arms, the two side members of each of said arms lying in the same plane and all of said members being subjected to torsional stresses upon a relative movement of the inner and outer ends of said arms in a direction of the axis of the star-shaped spring.

5. A spring formed of a single piece of wire bent into star shape with double arms having its ends united in one of the connecting portions of said arms, the side members of said arms being substantially straight, and the opposite ends of said arms being adapted to engage with bodies relatively movable in the direction of the axis of said star, said movement being resisted by resulting torsional stress to which the side members of said arms are subjected.

6. A spring formed from a rod of metal bent into star shape with double arms, the side members of which are substantially straight and the opposite ends of said arms being adapted to engage with bodies relatively movable in the direction of the axis of said star, said movement being resisted by resulting torsional stress to which the side members of said arms are subjected.

7. A spring including a plurality of substantially straight rods, each rod having portions integral therewith at opposite ends and at an angle thereto and at an angle to each other, the portions at one end of all of said rods lying in one plane and the portions at the opposite ends of all of said rods lying in a plane, said rods being subjected to torsional stresses upon a relative movement of one set of end portions toward and from the plane of the other set of end portions, the oppositely acting forces being applied at the ends of said rods.

8. A spring including a plurality of substantially straight and substantially radially disposed rods, each rod being connected to one adjacent rod at the inner end and to the other adjacent rod at the other end, the inner ends of all of said rods being disposed in one plane and the outer ends of all of said rods being disposed in another plane, the opposite ends of said rods being adapted to engage with bodies relatively movable in the direction of the axis of the spring, said movement being resisted by the resulting torsional stress to which said rods are subjected.

9. A spring including a plurality of substantially straight and substantially radially disposed rods, each having portions integral therewith at opposite ends and at an angle thereto and at an angle to each other, the angular portions at the inner ends of all of said rods being disposed in one plane and the angular portions at the outer ends of all of said rods being disposed in another plane, the opposite ends of said rods being adapted to engage with separate bodies relatively movable in the direction of the axis of said spring, said movement being resisted by the resulting torsional stress to which said rods are subjected.

LUC LÉON BASILE DENIS.

Witnesses:
HANSON C. COXE,
GEORGES CHARLES COQUET.

Copies of this patent may be obtained for five cents each, by addressing the "Commissioner of Patents, Washington, D. C."